United States Patent [19]

Frame

[11] 4,124,494

[45] Nov. 7, 1978

[54] TREATING A PETROLEUM DISTILLATE WITH A SUPPORTED METAL PHTHALOCYANINE AND AN ALKANOLAMINE HYDROXIDE

[75] Inventor: Robert R. Frame, Glenview, Ill.

[73] Assignee: UOP Inc., Des Plaines, Ill.

[21] Appl. No.: 868,600

[22] Filed: Jan. 11, 1978

[51] Int. Cl.$^2$ ............................................. C10G 27/06
[52] U.S. Cl. ................................................. 208/207
[58] Field of Search ................ 208/207, 206; 252/428, 252/431 N

[56] References Cited

U.S. PATENT DOCUMENTS

| | | | |
|---|---|---|---|
| 2,671,048 | 3/1954 | Rosenwald | 208/207 |
| 2,978,404 | 4/1961 | Bowers | 208/207 |
| 3,164,544 | 1/1965 | Bowers | 208/206 |
| 3,978,137 | 8/1976 | Frame | 208/207 |
| 4,003,827 | 1/1977 | Carlson et al. | 208/206 |
| 4,033,860 | 7/1977 | Carlson | 208/207 |
| 4,070,271 | 1/1978 | Carlson et al. | 208/206 |

*Primary Examiner*—George Crasanakis
*Attorney, Agent, or Firm*—James R. Hoatson, Jr.; Robert W. Welch; William H. Page, II

[57] ABSTRACT

A process for treating a mercaptan-containing sour petroleum distillate is disclosed. The process comprises passing said distillate in admixture with an oxidizing agent through a fixed bed of a supported metal phthalocyanine catalyst in the presence of an alkanolamine hydroxide, e.g., ethanoltrimethylammonium hydroxide.

10 Claims, No Drawings

TREATING A PETROLEUM DISTILLATE WITH A SUPPORTED METAL PHTHALOCYANINE AND AN ALKANOLAMINE HYDROXIDE

Processes for treating sour petroleum distillates wherein the distillate is passed in contact with a supported metal phthalocyanine catalyst in the presence of an oxidizing agent and an alkaline reagent, have become well-known and widely practiced in the petroleum refining industry. One such process is described in U.S. Pat. No. 2,988,500. The process is typically designed to effect the oxidation of offensive mercaptans contained in a sour petroleum distillate with the formation of innocuous disulfides—a process commonly referred to as sweetening. The oxidizing agent is most often air admixed with the sour petroleum distillate to be treated, and the alkaline reagent is most often an aqueous caustic solution charged continuously to the process or intermittently as required. Gasoline, including natural, straight run and cracked gasoline, is the most frequently treated petroleum distillate. Other sour petroleum distillates subject to treatment include the mercaptan-containing normally gaseous petroleum fractions as well as the higher boiling naphtha, kerosene, jet fuel and lub oil fractions, and the like.

It is an object of this invention to present a novel process for treating a sour petroleum distillate and effecting improved oxidation of the mercaptans contained therein.

In one of its broad aspects, the present invention embodies a process which comprises passing a mercaptan-containing sour petroleum distillates in admixture with an oxidizing agent through a fixed bed of a supported metal phthalocyanine catalyst in the presence of an alkanolamine hydroxide having the structural formula

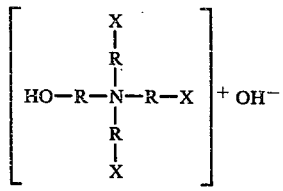

wherein R is an alkylene radical containing up to about 3 carbon atoms and X is a hydroxyl radical or hydrogen.

One of the more specific embodiments concerns a process which comprises passing said sour petroleum distillate in admixture with air through a fixed bed of a charcoal-supported cobalt phthalocyanine catalyst in the presence of an ethanoltrialkylammonium hydroxide.

A still more specific embodiment relates to a process for treating a mercaptan-containing sour petroleum distillate which comprises passing said distillate in admixture with air through a fixed bed of charcoal-supported cobalt phthalocyanine disulfonate catalyst at a liquid hourly space velocity of from about 0.1 to about 10 in the presence of from about 500 ppm ethanoltrimethylammonium hydroxide based on the weight of said distillate.

Other objects and embodiments of this invention will become apparent in the following detailed specification.

Pursuant to the present invention, the offensive mercaptans contained in a sour petroleum distillate are oxidized to innocuous disulfides in the presence of an alkanolamine hydroxide. The alkanolamine hydroxide is conveniently employed as an aqueous or alcoholic solution thereof—a molar concentration of from about 0.5 to about 5 being suitably effective. It is a preferred practice to prewet the catalyst bed with the alkanolamine hydroxide prior to contact with the sour petroleum distillate—the alkanolamine hydroxide being subsequently charged to the process in admixture with the sour petroleum distillate charged thereto, continuously or intermittently as required to maintain from about a 1 to about a 500 ppm concentration based on the weight of the sour petroleum distillate.

The alkanolamine hydroxides herein contemplated are represented by the structural formula.

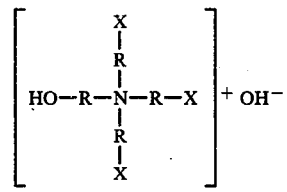

wherein R is an alkylene radical containing up to about 3 carbon atoms and X is a hydroxyl radical or hydrogen. Suitable alkanolamine hydroxides thus include alkanoltrialkylammonium hydroxides, particularly ethanoltrialkylammonium hydroxides like ethanoltrimethylammonium hydroxide, ethanoltriethylammonium hydroxide and ethanoltripropylammonium hydroxide, but also methanoltrimethylammonium hydroxide, methanoltriethylammonium hydroxide, methanoltripropylammonium hydroxide, propanoltrimethylammonium hydroxide, propanoltriethylammonium hydroxide, propanoltripropylammonium hydroxide, and the like. Other suitable alkanolamine hydroxides include dimethanoldimethylammonium hydroxide, dimethanoldiethylammonium hydroxide, dimethanoldipropylammonium hydroxide, trimethanolmethylammonium, trimethanolethylammonium hydroxide, trimethanolpropylammonium hydroxide, diethanoldimethylammonium hydroxide, diethanoldiethylammonium hydroxide, diethanoldipropylammonium hydroxide, triethanolmethylammonium hydroxide, triethanolethylammonium hydroxide, triethanolpropylammonium hydroxide, tetraethanolammonium hydroxide, and the like. Ethanoltrimethylammonium hydroxide (choline) is a preferred alkanolamine.

The metal phthalocyanines employed to catalyze the oxidation of mercaptans contained in sour petroleum distillates generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate or a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

For use in the fixed bed treating operation, the metal phthalocyanine catalyst can be adsorbed or impregnated on a solid adsorbent support in any conventional or otherwise convenient manner. In general, the support or carrier material in the form of spheres, pills, pellets, granules or other particles of uniform or irregular shape and size, is dipped, soaked, suspended or otherwise immersed in an aqueous or alcoholic solution and/or dispersion of the metal phthalocyanine catalyst, or the aqueous or alcoholic solution and/or dispersion may be sprayed onto, poured over, or otherwise contacted with the adsorbent. In any case, the aqueous solution and/or dispersion is separated, and the resulting composite is allowed to dry under ambient temperature conditions, or dried at an elevated temperature in an oven or in a flow of hot gases, or in any other suitable manner.

It is generally preferable to adsorb as much metal phthalocyanine on the adsorbent support or carrier material as will form a stable catalytic composite—generally up to about 25 wt.%, although a lesser amount in the range of from about 0.1 to about 10 wt.% affords a suitably active catalytic composite. One suitable and convenient method comprises predisposing the solid support or carrier material in the distillate treating zone or chamber as a fixed bed, and passing the metal phthalocyanine solution and/or dispersion through the bed in order to form the catalytic composite in situ. This method allows the solution and/or dispersion to be recycled one or more times to achieve a desired concentration of the metal phthalocyanine on the adsorbent support. In still another method, the adsorbent support may be predisposed in said treating chamber and the chamber thereafter filled with the metal phthalocyanine solution and/or dispersion to soak the support for a predetermined period, thereby forming the catalytic composite in situ.

The metal phthalocyanine catalyst can be adsorbed or impregnated on any of the well-known solid adsorbent materials generally utilized as a catalyst support. Preferred adsorbent materials include the various charcoals produced by the destructive distillation of wood, peat, lignite, nutshells, bones, and other carbonaceous matter, and preferably such charcoals as have been heat treated or chemically treated or both, to form a highly porous particle structure of increased adsorbent capacity and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc. or combinations thereof like silica-alumina, silica-zirconia, alumina-zirconia, etc. Any particular solid adsorbent material is selected with regard to its ability under conditions of its intended use. For example, in the treatment of a sour petroleum distillate heretofore described, the solid adsorbent carrier material should be insoluble in, and otherwise inert to, the petroleum distillate at the alkaline reaction conditions existing in the treating zone. In the latter case, charcoal, and particularly activated charcoal, is preferred because of its capacity for metal phthalocyanine, and because of its stability under treating conditions.

The process of this invention can be effected in accordance with prior art treating conditions. The process is usually effected at ambient temperature conditions, although higher temperatures up to about 150° C. are suitably employed. Pressures of up to about 1000 psi or more are operable, although atmospheric or substantially atmospheric pressures are entirely suitable. Contact times equivalent to a liquid hourly space velocity of from about 1 to about 100 or more are effective to achieve a desired reduction in the mercaptan content of a sour petroleum distillate, an optimum contact time being dependent on the size of the treating zone, the quantity of catalyst therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. The sour petroleum distillate may be passed upwardly or downwardly through the catalyst bed. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

The sour petroleum distillates vary widely in composition depending on the source of the petroleum from which the distillate was derived, the boiling range of the distillate, and possibly the method of processing the petroleum to produce the distillate. The process of the present invention is particularly adapted to the treatment of petroleum distillates boiling in excess of about 135° C. e.g., kerosene, jet fuel, fuel oil, naphtha and the like. These higher boiling distillates generally contain the more difficultly oxidizable mercaptans, e.g., the highly hindered branched chain and aromatic thiols—especially the higher molecular weight tertiary and polyfunctional mercaptans.

The following examples are presented in illustration of one preferred embodiment of this invention and are not intended as an undue limitation of a generally broad scope of the invention as set out in the appended claims.

EXAMPLE I

The sour petroleum distillate treating in this and subsequent examples is a kerosene fraction boiling in the 352°–454° F. range at 742mm. The kerosene had a specific gravity of 0.8081 and contained 448 ppm. mercaptan sulfur. In this example, the kerosene was charged downflow through 100cc of a charcoal-supported cobalt phthalocyanine monosulfonate catalyst disposed as a fixed bed in a vertical tubular reactor. The catalyst bed consisted of about 1 wt. % cobalt phthalocyanine monosulfonate adsorbed on 10–30 mesh activated charcoal particles. The kerosene was charged at a liquid hourly space velocity of about 0.5 under 45 psig of air—sufficient to provide about twice the stoichiometric amount of oxygen required to oxidize the mercaptans contained in the kerosene. The catalyst bed was initially wetted with about 40cc of a 2M aqueous ethanoltrimethylammonium hydroxide solution, 10cc of said solution being subsequently charged to the catalyst bed at 12 hour intervals admixed with the kerosene charged thereto. The treated kerosene was analyzed periodically for mercaptan sulfur.

EXAMPLE II

In this example, the mercaptan-containing kerosene fraction was charged downflow through 100cc of the charcoal-supported cobalt phthalocyanine monosulfonate catalyst disposed as a fixed bed in a tubular reactor. The reaction conditions were substantially the same as in the previous example. However, in keeping with prior art practice, the catalyst bed was initially wetted with about 40cc of a 2M aqueous caustic solution instead of the aforementioned ethanoltrimethylammonium hydroxide, 10cc of the caustic solution being subsequently charged to the catalyst bed at 12 hour intervals admixed with the kerosene. The thus treated kerosene was analyzed periodically for mercaptan sulfur. The analytical results are set out in Table I below under Run No. 2.

TABLE I

| On Stream, Hrs. | Mercaptan Sulfur, ppm | |
|---|---|---|
| | Run No.1 | Run No. 2 |
| 0 | 448 | 448 |
| 40 | 6 | 13.5 |
| 80 | 5.5 | 13 |
| 120 | 5.1 | 12 |
| 160 | 4.4 | 11.5 |
| 200 | 3.8 | 11 |
| 240 | 5.2 | 13 |
| 300 | 5.0 | 14 |

I claim as my invention:

1. A process for treating a mercaptan-containing sour petroleum distillate to oxidize the mercaptan present in said distillate, said process comprises passing said distillate in admixture with an oxidizing agent through a fixed bed of a supported metal phthalocyanine catalyst in the presence of an alkanolamine hydroxide having the structural formula

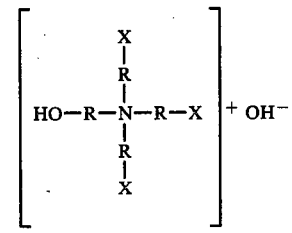

wherein R is an alkylene radical containing up to about 3 carbon atoms, and X is a hydroxyl radical or hydrogen.

2. The process of claim 1 further characterized in that said alkanolamine hydroxide is an alkanoltrialkylammonium hydroxide.

3. The process of claim 1 further characterized in that said alkanolamine hydroxide is an ethanoltrialkylammonium hydroxide.

4. The process of claim 1 further characterized in that said alkanolamine hydroxide is ethanoltrimethylammonium hydroxide.

5. The process of claim 1 further characterized in that said alkanolamine hydroxide is present in an amount equivalent to from about 1 to about 500 ppm. based on the weight of the sour petroleum distillate.

6. The process of claim 1 further characterized in that said sour petroleum distillate is passed through said catalyst bed at a liquid hourly space velocity of from about 0.1 to about 10.

7. The process of claim 1 further characterized in that said catalyst is a charcoal-supported cobalt phthalocyanine.

8. The process of claim 1 further characterized in that said catalyst is a charcoal-supported sulfonated derivative of cobalt phthalocyanine.

9. The process of claim 1 further characterized in that said catalyst is a charcoal-supported cobalt phthalocyanine disulfonate.

10. The process of claim 1 further characterized in that said catalyst comprises from about 0.1 to about 10 wt. % metal phthalocyanine.

* * * * *